United States Patent [19]
Ragen

[11] 3,753,821
[45] Aug. 21, 1973

[54] METHOD OF RETREADING PNEUMATIC TIRES WITHOUT A MOLD

[75] Inventor: Bradley E. Ragen, Spruce Pine, N.C.
[73] Assignee: Brad Ragan, Inc., Spruce Pine, N.C.
[22] Filed: Feb. 1, 1971
[21] Appl. No.: 111,461

[52] U.S. Cl.................. 156/96, 156/129, 156/394, 264/36, 264/279, 264/342, 264/347
[51] Int. Cl.......................... B29h 5/04, B29h 17/36
[58] Field of Search.............. 156/96, 110 R, 128 R, 156/129, 394, 405, 406, 411; 264/342, 26, 279, 347

[56] References Cited
UNITED STATES PATENTS
| | | | |
|---|---|---|---|
| 2,774,409 | 12/1956 | Skidmore | 156/96 |
| 724,830 | 4/1903 | Edmunds | 156/129 X |
| 1,426,672 | 8/1922 | Radford | 156/129 X |
| 2,345,518 | 3/1944 | Wendel | 156/96 X |
| 2,282,579 | 5/1942 | Hawkinson | 156/96 |
| 3,407,106 | 10/1968 | Barefoot | 156/405 |

Primary Examiner—Alfred L. Leavitt
Assistant Examiner—C. B. Cosby
Attorney—Parrott, Bell, Seltzer, Park & Gibson

[57] ABSTRACT

Method of retreading pneumatic tires by the application to a previously used pneumatic tire carcass of a cured rubber tread band wherein proper adhesion of tread band to the previously used tire carcass is facilitated by use of an uncured rubber strip of predetermined cross-sectional configuration concave to fit the carcass. The tread is applied to a relaxed carcass and its length is preselected as less than the circumference so that on vulcanizing at the same temperature as the shrink temperature of the carcass (about 200°F), the tread will just surround the carcass. The composition of the uncured strip is selected to vulcanize at this same temperature.

5 Claims, 7 Drawing Figures

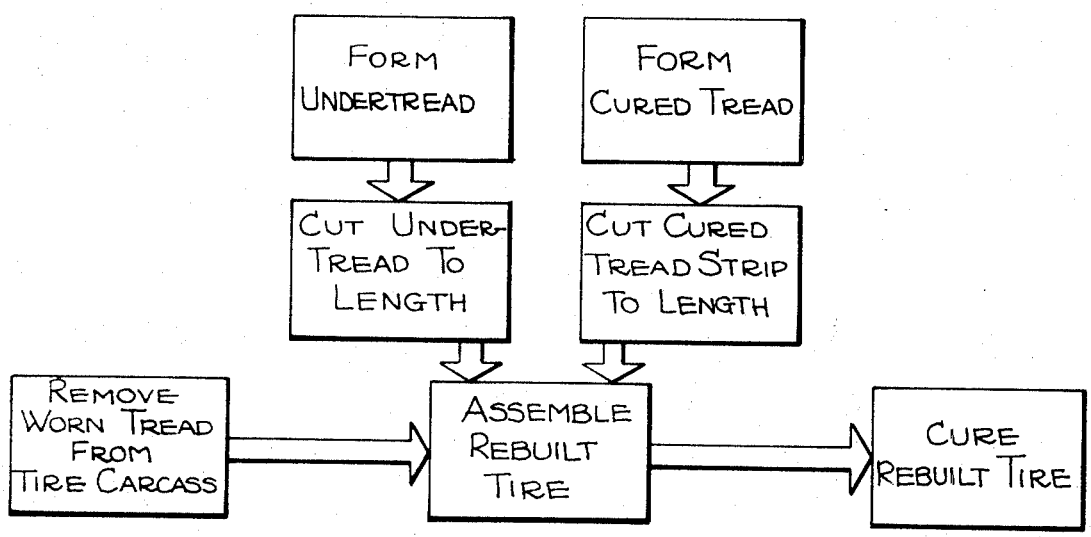
Fig-1
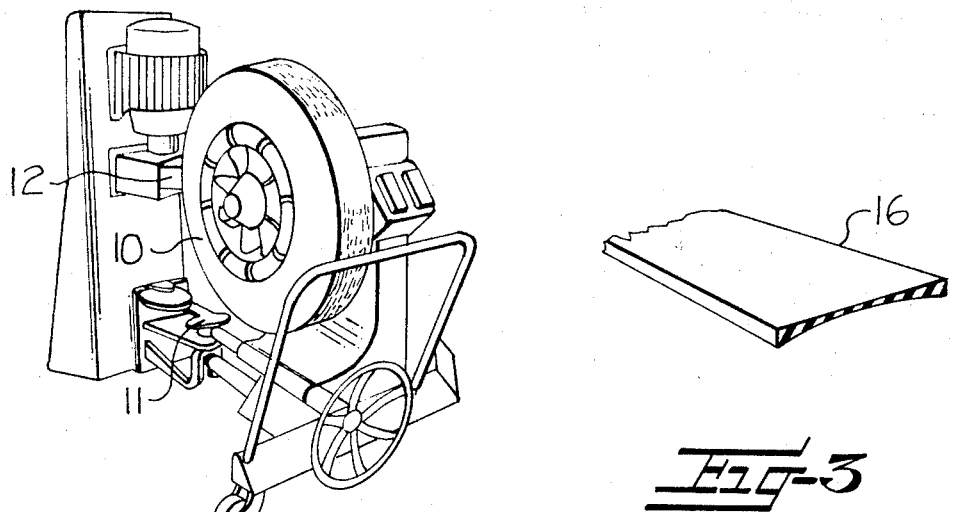
Fig-2
Fig-3
INVENTOR:
BRADLEY E. RAGAN

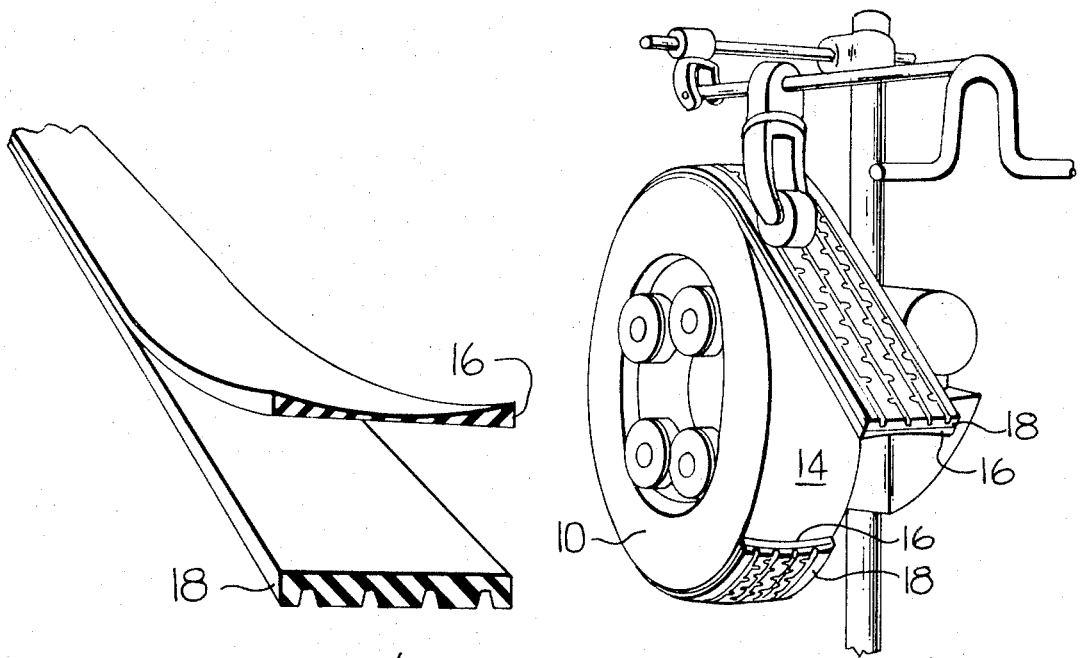
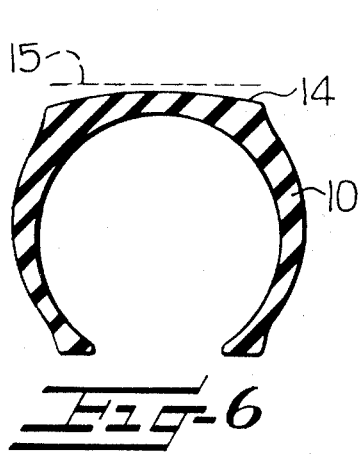
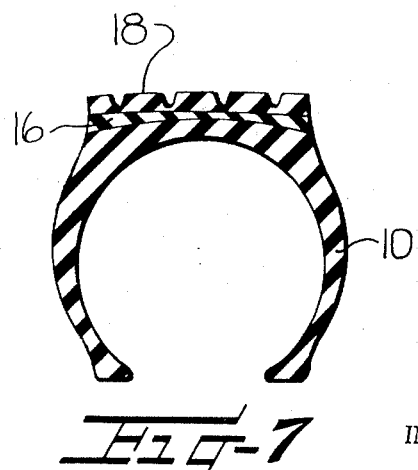
INVENTOR:
BRADLEY E. RAGAN

METHOD OF RETREADING PNEUMATIC TIRES WITHOUT A MOLD

Conventional mold curing retreading processes involve applying a body of uncured rubber referred to as "camelback" to a previously used pneumatic tire carcass and then inserting the assembled, retreaded tire into an enclosing mold which is typically heated to temperatures of approximately 295°F for intervals of time up to twelve to fifteen hours. It has heretofore been proposed that previously used pneumatic tires be retreaded by alternate processes which have been characterized by way of contrast as being "low temperature" processes. In accordance with such methods, the tread surface of a retreaded tire is formed by a cured rubber tread band adhered to the prepared surface of a previously used tire carcass. The low temperature characterization heretofore applied to such processes reflects the use of special self-vulcanizing compounds somewhat similar to cushion gum and curing of a prepared tire at temperatures on the order of 200°F and for intervals of time in the range of 5 hours.

While retreading methods using cured rubber tread bands and processing as briefly described above have been found to produce commercially acceptable products, certain difficulties and deficiencies encountered in the practice of such methods cause production of a relatively large number of improperly retreaded tires which must be rejected, additional expense in an effort to avoid such production of improperly retreaded tires, or both. In particular, the cured rubber tread bands used in the practice of such methods typically have a generally rectangular cross-sectional configuration, a tread design impressed into one face thereof, and a generally planar surface on the face thereof opposing the face bearing the tread design. Being cured, such a tread band has a tendency to maintain the generally flat and planar form given to the tread band at the time of curing.

As will be understood, the buffing of a previously used pneumatic tire carcass to remove worn tread therefrom typically produces a crowned or arched surface across the face of the tire carcass, with the degree of curvature or arch depending upon the size and design of the tire carcass, the buffing apparatus used, and the whim of the buffing operator. Such a crown or arched surface clearly will not properly mate with a cured rubber tread band having a flat or generally planar configuration.

In "low temperature" retreading methods as practiced prior to the present invention, contact between the cured rubber tread band and the prepared surface of a previously used pneumatic tire carcass has been accomplished by transverse arching or curving of the cured rubber tread band. As will be apparent, the tread band is thus stressed transversely thereof on application to the prepared tire carcass. In curing of such a retreaded tire, the side edge portions or wings of the cured rubber tread band frequently lift or raise from the tire carcass, providing a point of separation of the tread from the carcass which leads to early failure of the retreaded tire if the tire is permitted to go into service in such condition. For that reason, a retreaded tire in which the wings of the cured rubber tread band have lifted during curing must be rejected and reprocessed or discarded.

Previous attempts to overcome this problem have relied upon the use of enclosing envelopes or encircling steel bands intended to hold the cured rubber tread band in transversely stressed position during the curing process, but such attempts to remedy the difficulty created by the stressed condition of the tread band have only succeeded in slightly reducing the number of rejects of tires processed in accordance with such methods. In conjunction with such use of an envelope or band, assembled tires have been mounted upon rims and inflated during curing, increasing the labor required in carrying out the process, lengthening the time required for curing, and introducing permanent distortion of the carcass by curing of the assembled tire in a distorted condition. Thus, even such percentage of tires processed which are not subject to wing lifting failure are subject to other shortcomings.

With the above discussion in mind, it is an object of the present invention to accomplish the retreading of previously used pneumatic tire carcasses by the application of cured rubber tread bands thereto while avoiding lifting of the side edges or wings of the tread band by maintaining the tread band in a substantially relaxed condition transversely thereof during assembly and curing of the retreaded tire. In accomplishing this object of present invention, reliance is placed upon control over the shaping of a smooth surface on a previously used pneumatic tire carcass and the formation of a bonding strip of uncured rubber having a predetermined cross-sectional configuration.

A further object of the present invention is to facilitate production of retreaded tires by reduction of labor and time requirements in the processing of such tires and by avoidance of shortened tread life otherwise resulting from tire distortion. This object is realized through curing of an assembled tire in a relaxed state and through accomodation of tire carcass shrinkage occuring during such curing.

Some of the objects and advantages of the invention having been stated, others will appear as the description proceeds, when taken in connection with the accompanying drawings, in which FIG. 1 is a diagram of the steps in practicing the method of the present invention;

FIG. 2 is a perspective view of a tire buffing apparatus and a previously used pneumatic tire carcass, during one step in the method diagramed in FIG. 1;

FIG. 3 is a perspective view, partially in section, of an undertread strip of uncured rubber formed in accordance with the method of the present invention;

FIG. 4 is a perspective view of an undertread strip and tread band, illustrating one step in the method of the present invention;

FIG. 5 is a perspective view of a stiching apparatus, illustrating another step in the method of the present invention;

FIG. 6 is an enlarged elevation view, in section, through a portion of a tire carcass prepared in accordance with the present invention; and FIG. 7 is a view similar to FIG. 6, illustrating a retreaded tire at another stage in the practice of the method in accordance with the present invention.

Referring to the drawings, the method of the present invention will be described first briefly with reference to the flow chart of FIG. 1, and then in greater detail with reference to the processing of a highway vehicle tire such as a truck tire 10 as illustrated in FIGS. 2 - 8. At the outset, it is to be noted that the method of the present invention finds its greatest utility in connection with the retreading of highway vehicle tires such as passenger automobile tires and truck tires. As will be pointed out more fully hereinafter, the retreading of such tires permits use of previously cured rubber tread band having tread patterns pressed thereinto which are substantially identical to those patterns molded into such tires during the original manufacture thereof.

Referring now more particularly to FIG. 1, the method of the present invention includes certain steps culminating in the assembly of a retreaded tire which is then cured in an open vessel. The preparatory steps, in accordance with the present invention, include buffing a previously used pneumatic care carcass to remove worn tread therefrom and form a smooth surface thereon. Such buffing is performed while the smooth surface thereby formed is shaped to a predetermined contour. Other preparatory steps including the forming of a cured rubber tread band of predetermined characteristics and the forming of uncured rubber into a thin strip having predetermined characteristics including a predetermined cross-sectional configuration. Following such preparatory steps, the buffed tire carcass, formed strip and tread band are assembled with the strip interposed between the carcass and the tread band, so that the uncured rubber of the strip presents large areas for bonding both to the previously cured rubber of the carcass and to the previously cured rubber of the tread band.

In accordance with an important feature of the present invention, the tread band when present in the assembled tire is in a substantially relaxed condition transversely of the band. That is, the wing portions or side edges of the cured rubber band are not so distorted from the relaxed position assumed thereby as to have a tendency to lift during the curing process. This feature of the method of the present invention facilitates curing in a most simple and straightforward manner, as avoiding the necessity of using any enclosing envelope or encircling band to restrain cured rubber tread band in a tensioned condition.

Referring now more particularly to FIGS. 2 – 8, buffing of a previously used pneumatic tire carcass 10 preferably proceeds through the use of an apparatus provided with a template 11 which controls the removal of worn tread from the tire 10 by a suitable cutting tool 12 in such a manner that a smooth surface 14 formed on the carcass 10 is shaped to a predetermined contour. It is important to an understanding of the present invention to note that the smooth surface 14 formed on the tire carcass 10 by means of the buffing and shaping steps has a predetermined relationship to a right circular cylindrical surface, such as the surface indicated by the phantom line 15 in FIG. 6.

The difference between the predetermined contour of the smooth surface 14 and the right circular cylindrical surface 15 is taken into account in another of the preparatory steps in accordance with the method of this invention, namely the forming of uncured rubber into a thin strip 16 (FIGS. 3 and 7). The thin strip 16 has a cross-sectional configuration shaped in correlation to the difference pointed out above, and preferably is formed of natural rubber by a process of extrusion. In practicing extrusion for the formation of the strip 16, it is preferred to use an extruder which is capable of accepting dies for the formation of uncured rubber into a thin strip of varying predetermined cross-sectional configurations, thereby permitting varying predetermined contours to be used in the shaping of the smooth surface 14, and the accommodation of different sizes of tire carcasses.

The forming of a cured rubber tread band may suitably proceed by extrusion of a band of generally rectangular cross-sectional configuration, impression thereinto of a suitable tread design, and curing of the band thus extruded and shaped. In accordance with the present invention, the cured rubber tread band thus formed has a generally rectangular cross-sectional configuration, a tread design in one face thereof, and a generally planar surface on the face thereof opposing the tread design bearing face (FIGS. 4, 5 and 7).

In the assembling of the buffed tire carcass 10, formed strip 16, and cured rubber tread band 18, it is preferred to cut a length of the uncured thin strip 16, position the thin strip with a surface thereof in engagement with a generally planar surface of the cured tread band 18, and stitch the tread band and thin strip together. Thereafter, a length of assembled cured tread band and uncured undertread strip having a length appropriate to encircle the tire carcass 10 is severed, positioned encircling a tire carcass 10, and stitched down.

In the process of assembling a retreaded tire in accordance with the present invention, it is foreseen that that undertread strip 16 may be first applied to the smooth surface 14 of the tire carcass 10 or to the generally planar surface of the cured rubber tread band 18. Further, the undertread strip 16 may be applied in a heated condition immediately after extrusion thereof, or may be stored for a relatively short interval of time and applied in a cooled condition. In using such variations on the method of the present invention, one or more of surfaces to be adhered together may be prepared by application of rubber solvents, rubber cements, or both. In the preferred process mentioned briefly above, wherein the undertread strip 16 is first stitched to the cured band 18, it is preferred to cement the generally planar surface of the cured rubber tread band prior to stitching of the undertread strip 16 thereto and to cement the smooth surface 14 of the tire carcass 10 prior to assembly of the tread band and undertread strip therewith.

Following assembly of a retreaded tire, the undertread strip 16 is vulcanized to both the tread band 18 and to the tire carcass 10. Vulcanization in accordance with curing processes as preferred for the present invention has been noted as also bringing about a slight shrinkage of the tire carcass being retreaded. Such shrinkage is accommodated in the process of the present invention, and while maintaining commercially satisfactory products, by the adoption of certain specific techniques. In particular, the length of tread band 18 used in assembling a retreaded tire is slightly less than the circumference of the smooth surface 14 which the band is to encircle, due to a differential in shrinkage of the tire carcass 10 and the cured band 18. Second, the uncured rubber used in forming the undertread strip 16 is formulated to have a curing temperature of approximately 200°F or substantially the same as that temperature at which tire carcass shrinkage occurs.

In the practice of the method of the present invention, an assembled retreaded tire prepared for curing has a narrow gap between the ends of the tread band 18 encircling the smooth surface 14 of the tire carcass 10. During curing, shrinkage of the tire carcass which begins as the temperature is raised above 200°F closes this gap and produces a butt splice of the tread band 18. Further, vulcanization of the undertread strip 16 proceeds substantially simultaneously with such shrinkage so as to minimize concentration of stress which otherwise might occur.

In curing an assembled, retreaded tire in accordance with the present invention, the tire preferably is placed in a steam autoclave. However, it is anticipated that satisfactory cure may be obtained in any open vessel which may be brought to a suitable temperature of at least about 250°F, maintained at such temperature for a period of time adequate to vulcanize the relatively thin undertread strip 16 such as at least about two hours, and which provides for maintaining tires being cured therein in a substantially undistorted condition. Thus, the fluid employed within the autoclave need not be steam but may be heated air or some other satisfactory heating fluid.

In the drawings and specification, there have been set forth a preferred embodiment of the invention, and although specific terms are employed, there are used in a generic and descriptive sense only and not for purposes of limitation.

I claim:

1. A method of retreading a previously used pneumatic tire comprising:

removing worn tread from a previously used pneumatic tire carcass and forming a smooth surface thereon while shaping the smooth surface to have a predetermined contour when the carcass is relaxed and free of any external restraint and pressure, selecting an uncured rubber compound formulated to have a curing temperature substantially the same as that temperature at which shrinkage of the tire carcass occurs and forming the selected rubber compound into a thin strip having a predetermined cross-sectional configuration shaped in correlation to the difference between said predetermined contour of said tire carcass smooth surface and a right circular cylindrical surface, severing a length slightly less than the circumference of the tire carcass from a supply of cured rubber tread band having a generally rectangular cross-sectional configuration, a tread design in one face thereof, and a generally planar surface on the face thereof opposing said one face, assembling the severed length of tread band and a length of formed thin strip in encircling relation with the smooth surface of the tire carcass and with the strip interposed between the tire carcass and the planar surface of the tread band so that the uncured rubber of the strip presents large areas for bonding to the previously cured rubber of the carcass and tread band while the tread band and carcass are substantially relaxed transversely and are free of any external restraint and pressure, depositing the assembled tread band, strip and tire carcass in a pressure vessel and subjecting the deposited assembly to elevated temperatures at least about the same as the tire carcass shrinkage temperature while maintaining the tread band and carcass substantially relaxed transversely and free of external restraint and pressure other than the ambient conditions existing within the vessel, and vulcanizing the strip and adhering the tire carcass and tread band together while shrinking the tire carcass to such dimensions that the circumference thereof and the tread band length are substantially the same.

2. A method according to claim 1 wherein the step of subjecting the assembly to elevated temperatures comprises admitting to the vessel a hot fluid atmosphere having a temperature of at least about 250°F.

3. A method according to claim 2 wherein the admission of a hot atmosphere comprises delivering steam into the vessel containing the assembly.

4. A method according to claim 2 wherein the vulcanizing of the strip comprises maintaining the assembly in the hot fluid atmosphere for a time period of at least about 2 hours.

5. A method according to claim 1 wherein the forming of the thin strip comprises extruding the selected rubber compound through a dye of predetermined configuration correlated to the predetermined contour of the tire carcass smooth surface.

* * * * *